(12) United States Patent
Albright et al.

(10) Patent No.: US 6,241,451 B1
(45) Date of Patent: Jun. 5, 2001

(54) DISTRIBUTOR APPARATUS FOR SPREADING MATERIALS

(75) Inventors: Christopher Albright, Brodhead; Claude L. McFarlane, Madison, both of WI (US)

(73) Assignee: Knight Manufacturing Corp., Brodhead, WI (US)

( * ) Notice: Subject to any disclaimer, the term of this patent is extended or adjusted under 35 U.S.C. 154(b) by 0 days.

(21) Appl. No.: 09/391,932

(22) Filed: Sep. 8, 1999

Related U.S. Application Data
(60) Provisional application No. 60/099,382, filed on Sep. 8, 1998.

(51) Int. Cl.$^7$ ............................... B60P 1/00; F16H 7/10
(52) U.S. Cl. ........................ 414/501; 474/101; 474/133; 239/684
(58) Field of Search ..................... 414/472, 501; 474/101, 113, 133, 136; 239/657, 679, 681, 684

(56) References Cited

U.S. PATENT DOCUMENTS

| | | | |
|---|---|---|---|
| 2,523,994 | * | 9/1950 | McCloy . |
| 2,659,608 | * | 11/1953 | Topp . |
| 2,958,530 | * | 11/1960 | Kucera et al. . |
| 3,084,942 | * | 4/1963 | Kucera . |
| 3,682,333 | * | 8/1972 | Krause ........................ 414/501 X |
| 3,722,307 | * | 3/1973 | Campbell . |
| 3,999,674 | * | 12/1976 | Meitl ........................... 414/501 X |
| 4,498,630 | * | 2/1985 | Sadler ......................... 239/684 X |
| 4,511,348 | * | 4/1985 | Witdoek ....................... 474/133 X |
| 4,552,547 | * | 11/1985 | Carnewal et al. ............. 474/101 |
| 5,362,279 | * | 11/1994 | Galchefski ................... 474/112 |

\* cited by examiner

*Primary Examiner*—James W. Keenan
(74) *Attorney, Agent, or Firm*—David J. Archer (57) ABSTRACT

A distributor apparatus is disclosed for spreading materials. The apparatus includes a container having a first and a second end and a first and a second side, the ends and the sides defining therebetween an opening for the reception therein of the materials. The container defines an outlet for the distributing therethrough of the materials. A distributing device is disposed in the vicinity of the outlet, the distributing device being pivotally secured to the container about a pivotal axis. The distributing device further includes a frame, a driven device rotatably secured to the frame for ejecting the materials from the container, a driving device for rotating the driven device such that the materials are moved from the container through the outlet by the driven device so that spreading of the materials from the container is permitted, a drive for driving the driving device and a guide for guiding the driving device between the driven device and the drive. The arrangement is such that an approximate sum of a distance travelled by the driving device from the drive to the driven device plus a further distance travelled by the driving device from the guide to the drive remains constant when the distributing device is pivoted between a first location adjacent to the container and a second location of the distributing device away from the container so that slack of the driving device is minimized during pivoting of the distributing device between the locations.

23 Claims, 5 Drawing Sheets

DISTRIBUTOR APPARATUS FOR SPREADING MATERIALS

This application claims the benefit of Provisional Application 60/099,382 filed Sep. 8, 1998.

BACKGROUND OF THE INVENTION

1. Field of the Invention

The present invention relates to a distributor apparatus for spreading materials. More specifically, the present invention relates to a distributor apparatus for spreading materials in which a rotatable distributor is used for spreading materials such as manure on a field.

2. Information Statement

In dairy farms and the like, manure from farm animals is collected and spread over fields in order to increase the crop yield from such fields and to restore the required nutrients to the soil so as to optimize crop production.

For many years spreaders have been used for spreading the aforementioned manure. Typically, a manure spreader includes a container for containing the materials such as manure to be distributed onto the field. A rotary distributor is disposed adjacent to an outlet located at the rear of the container so that when the container is moved across a field and the distributor is rotated, manure is moved through the outlet by the distributor so that the manure is evenly spread across the field.

However, when the container is loaded with manure, it often happens that rocks and other debris are dumped into the container. Consequently, such rocks and debris interfere with the rotation of the distributor. In the event of jamming of the distributor by rocks and the like, it has typically been necessary with prior art spreaders to manually unload the container in order to remove the debris. Such an operation can take up to half a day because the manure must be removed from the container by shovel and then be reloaded once the obstruction has been removed. In certain instances, the carcass of a dead animal such as a calf has been inadvertently dumped into a container thus preventing rotation of the distributor thus making the removal of the obstruction necessary.

Clearly, the aforementioned problem of unloading and clearing a distributor apparatus has proved to be a time consuming and unpleasant operation.

Consequently, arrangements have been proposed which include a container having a rear outlet and a distributing device pivotally secured to the container so that in the event of a rock becoming lodged within the distributor, the distributing device is pivoted away from the container to facilitate dumping of the contents of the container.

However, such prior art arrangements have utilized costly hydraulic motors and the like in order to provide a constant drive to the distributor when in both the operational mode and when the distributing device is pivoted away from the container.

The present invention avoids the considerable cost involved in providing hydraulic drive motors by using a unique mechanical chain drive mechanism which maintains a constant drive to the distributor regardless of whether the distributing device is adjacent to the container or pivoted away therefrom.

Therefore, it is a primary objective of the present invention to provide a distributor apparatus that overcomes the problems associated with the prior art arrangements and which makes a considerable contribution to the art of spreading materials.

Another feature of the present invention is the provision of a distributor apparatus in which a distributor is driven by a driving means such as a chain drive, the chain drive following a first path when the distributing device is in a first location adjacent to the container. The chain drive follows a second path when the distributing device is pivoted away from the container. However, the paths are arranged such that slack of the chain is minimized regardless of the location of the distributing device.

Other objects and advantages of the present invention will be readily apparent to those skilled in the art by a consideration of the detailed description contained hereinafter taken in conjunction with the annexed drawings.

Included in the aforementioned advantages are:

1) A substantially constant tension is maintained on the drive chain.
2) A chain tension idler if even necessary, hardly moves because the sum of the chain path lengths does not change.
3) An idler sprocket moves directly proportional to the movement of the hinged distributing device.
4) The idler sprocket is mechanically connected to the pivot point of the distributing device.
5) The idler sprocket is connected to the distributing device so that the idler sprocket is in a fixed position relative to and is attached to the moving distributing device.
6) The above arrangement avoids any problems associated with acceleration and momentum of the drive chain.
7) Additionally, without the arrangement of the present invention, a chain tension idler would have to be extremely strong to withstand the drive chain slack and this would be regardless of the location of the tension idler whether such location be on the driven or non driven side of the drive chain.
8) The chain tension idler if such idler is deemed necessary, does not move during the swing out operation of the distributing device.
9) Chain slack is minimized during the engagement of the power source such as a power take off (PTO) because the chain does not change direction or require the tension idler to move.
10) Constant tension is on the chain in either the retracted or extended position of the distributing device.
11) The drive chain linkage is already provided for driving the distributor and the chain linkage moves with the distributing device.
12) The power source can be engaged when the distributing device is retracted or extended.
13) The arrangement according to the present invention allows more flexibility for the removal of a distributor panel. In the prior proposals, the distributing device has typically been hinged at the distributor bearing which makes disassembly for panel removal a more complex operation.
14) Also, the distributing device being hinged higher on the container gives more opening on the bottom of the distributing device.
15) Additionally, the arrangement according to the present invention allows an independent swing out system that does not require a power source engagement.

SUMMARY OF THE INVENTION

The present invention relates to a distributor apparatus for spreading materials. The apparatus includes a container having a first and a second end and a first and a second side. The container defines an opening for the reception therein of the materials. The container defines an outlet for the distributing therethrough of the materials. A distributing device is disposed in the vicinity of the outlet, the distributing device being pivotally secured to the container about a pivotal axis. The distributing device further includes a frame, a driven means rotatably secured to the frame for moving the materials from the container, a driving means for rotating the driven means such that the materials are moved from the container through the outlet by the driven means so that spreading of the materials from the container is permitted, a drive for driving the driving means and a guide for guiding the driving means between the driven means and the drive. The arrangement is such that a sum of a distance travelled by the driving means from the drive to the driven means plus a further distance travelled by the driving means from the guide to the drive remains constant when the distributing device is pivoted between a first location adjacent to the container and a second location of the distributing device away from the container so that slack of the driving means is minimized during pivoting of the distributing device between the locations.

Many modifications and variations of the present invention will be readily apparent to those skilled in the art by a careful consideration of the following description of a preferred embodiment of the present invention. However, such modifications and variations full within the spirit and scope of the present invention as defined by the appended claims.

BRIEF DESCRIPTION OF THE DRAWINGS

Similar reference numerals refer to the same parts throughout the various views of the drawings.

DETAILED DESCRIPTION OF THE DRAWINGS

Figure 1:
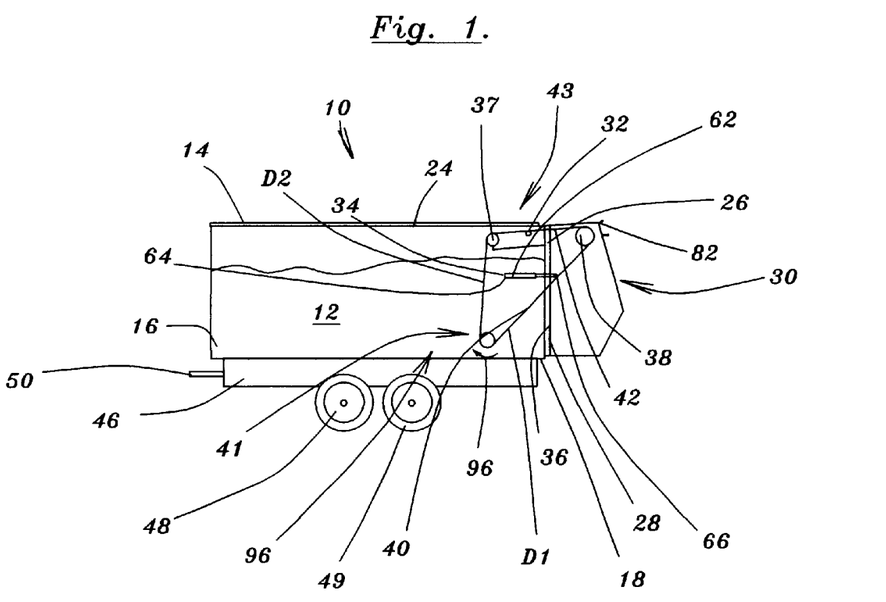
FIG. 1 is a side elevational view of a distributor apparatus according to the present invention for spreading materials.

FIG. 1 is an elevational view of a distributor apparatus generally designated 10 according to the present invention for spreading materials 12 such as manure and the like. The apparatus 10 includes a container 14 having a first and a second end 16 and 18 respectively and a first and a second side 20 and 22 (FIGS. 3 and 4) respectively, the ends 16 and 18 and the sides 20 and 22 defining therebetween an opening 24 for the reception therein of the materials 12. The container 14 defines an outlet 28 for the movement therethrough of the materials 12. A distributing device generally designated 30 is disposed in the vicinity of the outlet 28, the distributing device 30 being pivotally secured to the container 14 about a pivotal axis 32. A mechanism 34 is provided for swinging the distributing device 30 away from the outlet 28 about the pivotal axis 32 for permitting access to the container 14 such that clearing of the container 14 is facilitated.

The distributing device 30 further includes a frame 36, a driven means generally designated 37 rotatably secured to the frame 36 for ejecting the materials 12 from the container 14, a driving means 40 for rotating the driven means 37 such that the materials 12 are moved from the container 14 through the outlet 28 by the driven means 37 so that spreading of the materials 12 from the container 14 is permitted. Also, a drive generally designated 41 is provided for driving the driving means 40 and a guide generally designated 43 is included for guiding the driving means 40 between the driven means 37 and the drive 41. The arrangement is such that an approximate sum of a distance D1 travelled by the driving means 40 from the drive 41 to the driven means 37 plus a further distance D2 travelled by the driving means 40 from the guide 43 to the drive 41 remains constant when the distributing means 30 is pivoted between a first location adjacent to the container 14 as shown in FIG. 1 and a second location of the distributing means 30 away from the container 14 as shown in FIG. 2 so that slack of the driving means 40 is minimized during pivoting of the distributing means 30 between the locations.

Figure 2:
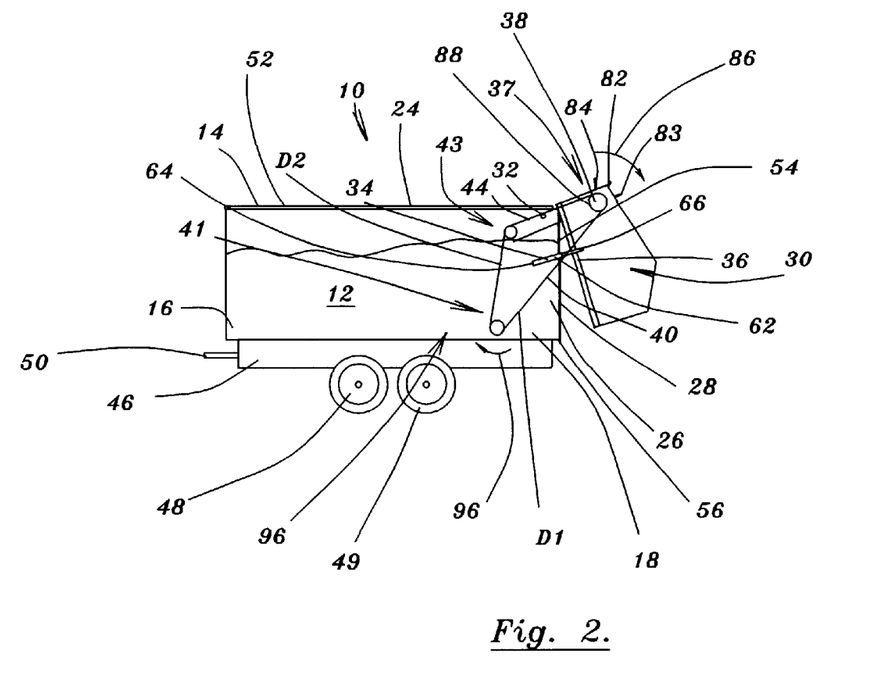
FIG. 2 is a similar view to that shown in FIG. 1 but with the distributing device disposed in the second location thereof away from the container.

FIG. 2 is a similar view to that shown in FIG. 1 but shows the distributing device 30 in the second location thereof. As shown in FIG. 2, when the distributing device 30 is swung about the pivotal axis 32 to the second location thereof in which the distributing device 30 is pivoted away from the outlet 28, the driving means such as drive chain 40 follows a different path from the path followed by the chain 40 when the distributing device is disposed in the first location thereof.

In a more specific embodiment of the present invention the distributor apparatus 10 further includes a chassis 46 for supporting the container 14 and a plurality of wheels 48 and 49 rotatably secured to the chassis 46 for permitting transportation of the chassis 46 and the container 14 supported thereon.

A tongue 50 extends from the chassis 46, the tongue 50 being disposed adjacent to the first end 16 of the container 14, the tongue 50 being used to draw and transport the container 14.

Also, the container 14 is of rectangular box shaped configuration, the opening 24 permitting top loading of the manure 12 into the container 14.

Additionally, the apparatus 10 further includes a cover 52 which cooperates with the opening 24 for inhibiting spillage of the manure 12 from the container 14 during transportation thereof.

Moreover, the pivotal axis 32 is disposed horizontally and the distributing device 30 is disposed beneath the pivotal axis 32.

Figure 3:
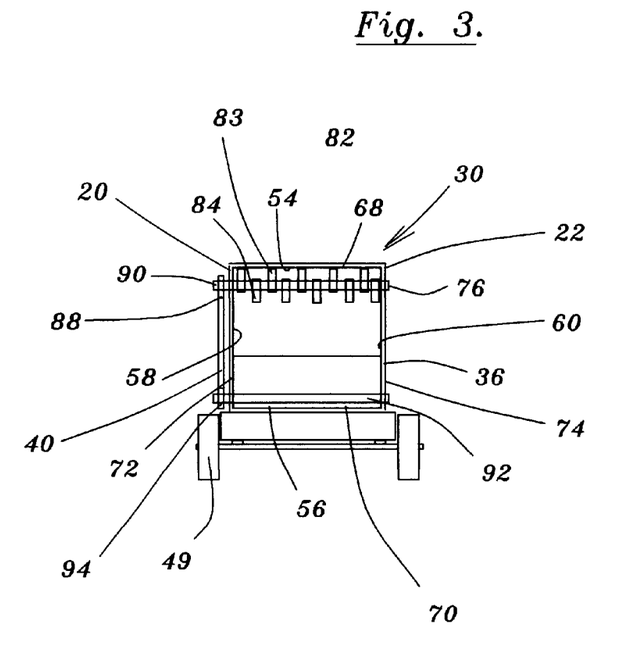
FIG. 3 is an end view of the apparatus shown in FIG. 1 when viewed from the right hand side of FIG. 1.

FIG. 3 is an end view of the apparatus shown in FIG. 1. As shown in FIG. 3, the second end 18 of the container 14 includes an upper and a lower edge 54 and 56 respectively and the first side 20 of the container 14 includes a first edge 58 and the second side 22 of the container 14 includes a second edge 60. The upper and lower edges 54 and 56 and the first and second edges 58 and 60 cooperate together to define the outlet 28. The pivotal axis 32 is disposed parallel and spaced relative to the upper edge 54 of the second end 18 of the container 14.

As shown in FIGS. 1 and 2, the mechanism 34 includes a lifting cylinder 62 having a first and a second extremity 64 and 66 respectively. The first extremity 64 of the lifting cylinder 62 is pivotally secured to the container 14 and the second extremity 66 is pivotally secured to the distributing device 30 such that when the lifting cylinder 62 is actuated, the distributing device 30 is pivoted about the pivotal axis 32 between the first and second locations thereof. In a preferred embodiment of the present invention, the lifting cylinder 62 is hydraulically operated. However, the lifting cylinder 62 could be either pneumatic, electro-mechanical or mechanical.

Furthermore, the frame 36 cooperates with and lies adjacent to the outlet 28 when the distributing device 30 is disposed in the first location thereof as shown in FIG. 1.

As shown in FIG. 3, the frame 36 includes an upper member 68 and a lower member 70 disposed spaced and parallel relative to the upper member 68. Also, the frame 36 includes a first panel 72 and a second panel 74 disposed spaced and parallel relative to the first panel 72, the first and second panels 72 and 74 respectively extending between the upper and lower members 68 and 70 respectively.

Figure 4:
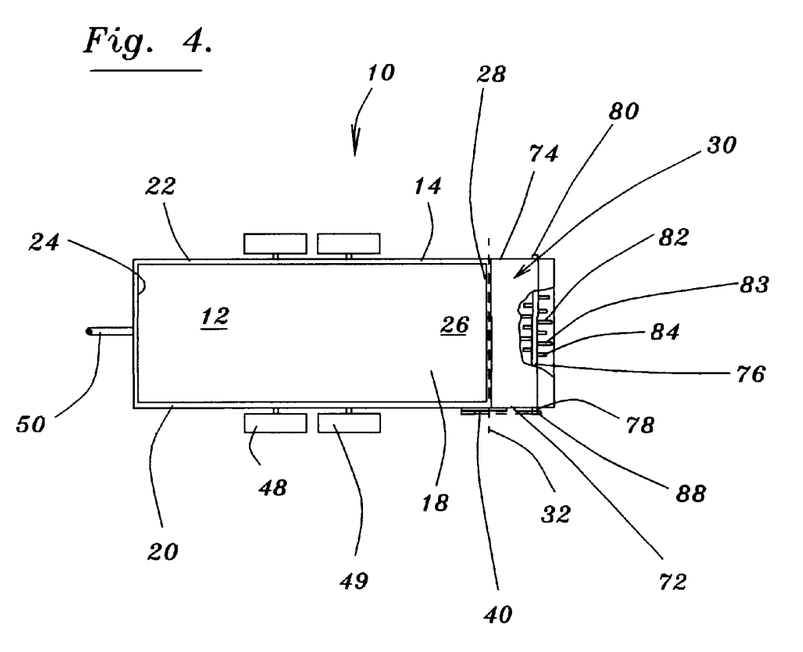
FIG. 4 is a top plan view of the apparatus shown in FIG. 1.

FIG. 4 is a top plan view of the distributor apparatus shown in FIG. 1. As shown in FIG. 4 the distributor apparatus 10 includes a driven shaft 76 having a first and a second end 78 and 80 respectively, the driven shaft 76 being bearingly supported by and extending through the panels 72 and 74 respectively such that the driven shaft 76 is disposed between the upper and lower members 68 and 70 respectively and parallel thereto.

Moreover, a plurality of distributor arms 82, 83 and 84 are secured to the driven shaft 76 between the panels 72 and 74 respectively. The distributor arms 82–84 extend radially from the driven shaft 76 for ejecting the materials 12 when the driven shaft 76 is being rotated as indicated by the arrow 86.

Figure 5:
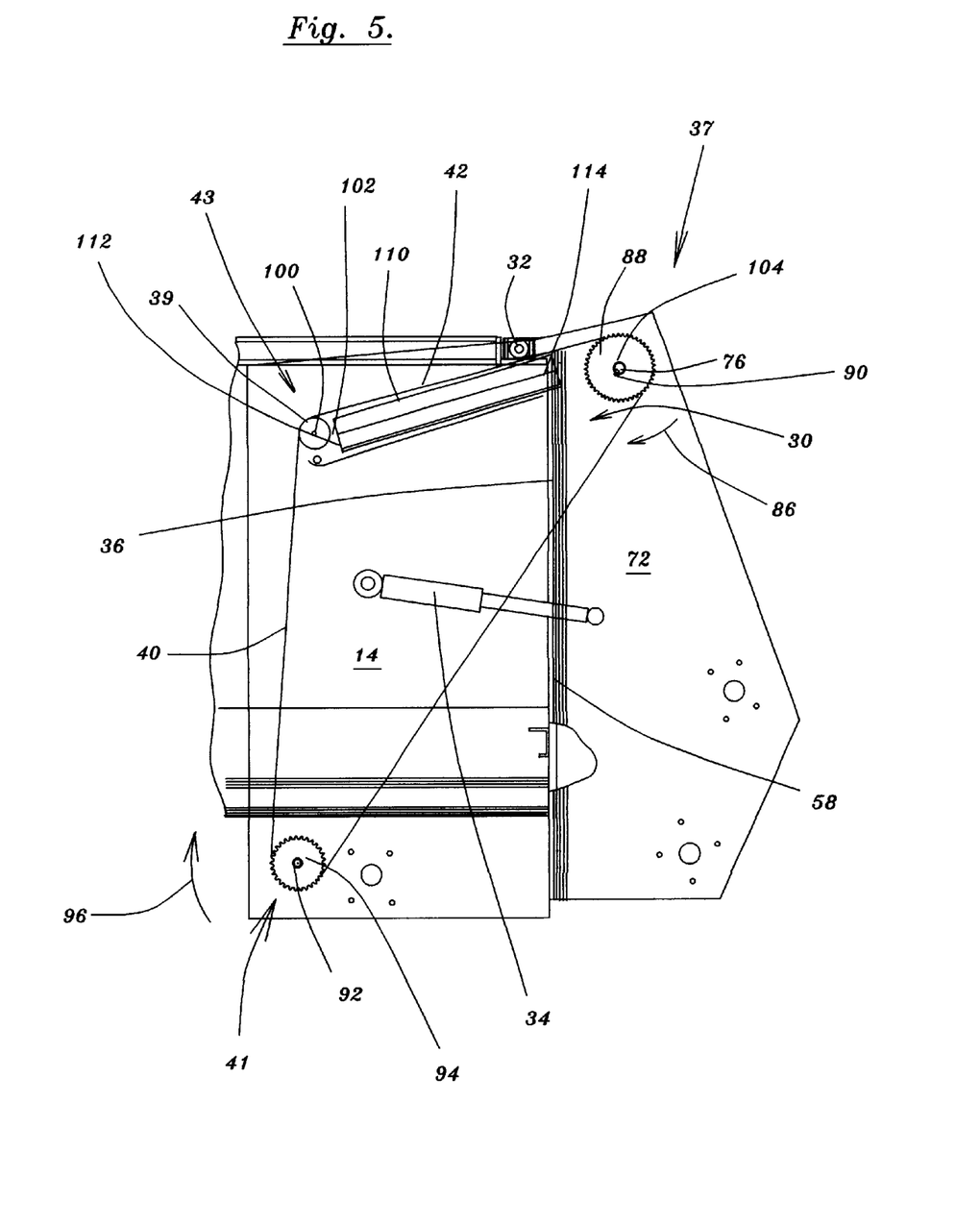
FIG. 5 is an enlarged side elevational view of the distributing device in the first location thereof of the apparatus as shown in FIG. 1.

FIG. 5 is an enlarged view of the distributing device 30. As shown in FIG. 5, the distributing device 30 further includes a driven sprocket 88 which cooperates with the driving means 40 which is preferably a chain such that movement of the driving means 40 relative to the driven sprocket 88 rotates the driven sprocket 88 as shown by the arrow 86. A key 90 is disposed between the driven sprocket 88 and the driven shaft 76 such that rotation of the driven sprocket 88 rotates the driven shaft 76 and the distributor arms 82–84 secured thereto. It will be understood by those skilled in the art that the key 90 could be replaced by a splined shaft arrangement or any other locking means for driving connecting the shaft 76 and the sprocket 88. A driving shaft 92 is bearingly supported by the container 14 and is disposed parallel and spaced relative to the driven shaft 76.

The drive 41 includes a driving sprocket 94 which is keyed or splined to the driving shaft 92 and cooperates with the driving means or drive chain 40 so that when the driving shaft 92 is rotated as indicated by the arrow 96, such rotation is transmitted to the driven shaft 76 by the drive chain 40.

The guide 43 includes an idler sprocket 39 which cooperates with and is driven by the drive chain 40. A stub shaft 100 is connected to the frame 36 at a first position 102 spaced from the pivotal axis 32, the stub shaft 100 rotatably supporting the idler sprocket 39 when the distributing device 30 is in the first location thereof as shown in FIGS. 1 and 5.

Additionally, the driven shaft 76 extends through the frame 36 at a second position 104 thereof when the distributing device 30 is in the first location thereof as shown in FIGS. 1 and 5.

Figure 6:
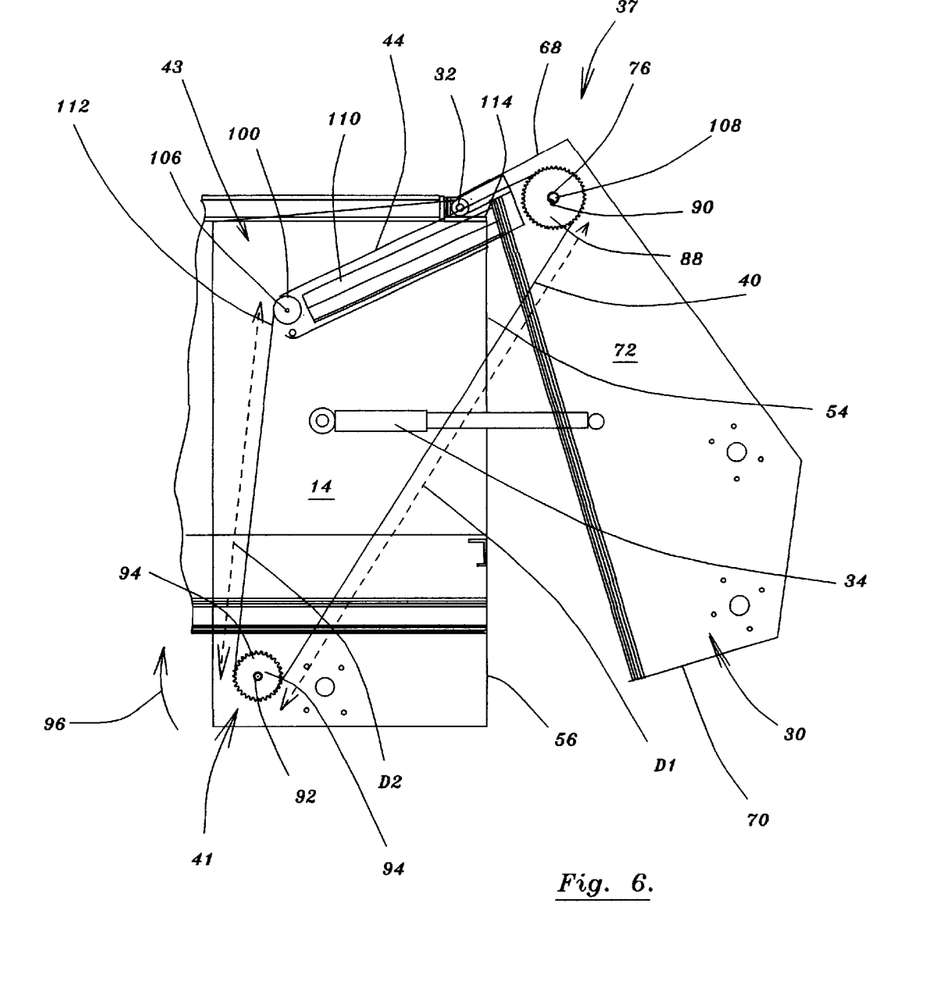
FIG. 6 is an enlarged side elevational view of the distributing device in the second location thereof of the apparatus as shown in FIG. 2.

FIG. 6 is an enlarged view of the distributing device 30 in the second location thereof. As shown in FIG. 6 when the distributing device 30 pivots about the pivotal axis 32 to the second location thereof as shown in FIGS. 2 and 6, the stub shaft 100 moves to a third position 106 and the driven shaft 76 moves to a fourth position 108 on the opposite side of the pivotal axis 32. The arrangement is such that when the distributing device 30 is in the first and second locations thereof as shown in FIGS. 5 and 6 respectively, the tension in the driving means 40 remains substantially constant.

Also, the distributing device 30 further includes an extension plate 110 having a first and a second end 112 and 114 respectively. The first end 112 of the plate 110 supports the stub shaft 100 and the second end 114 of the plate 110 is rigidly secured to the first panel 72 adjacent to the pivotal axis 32.

Figure 7:
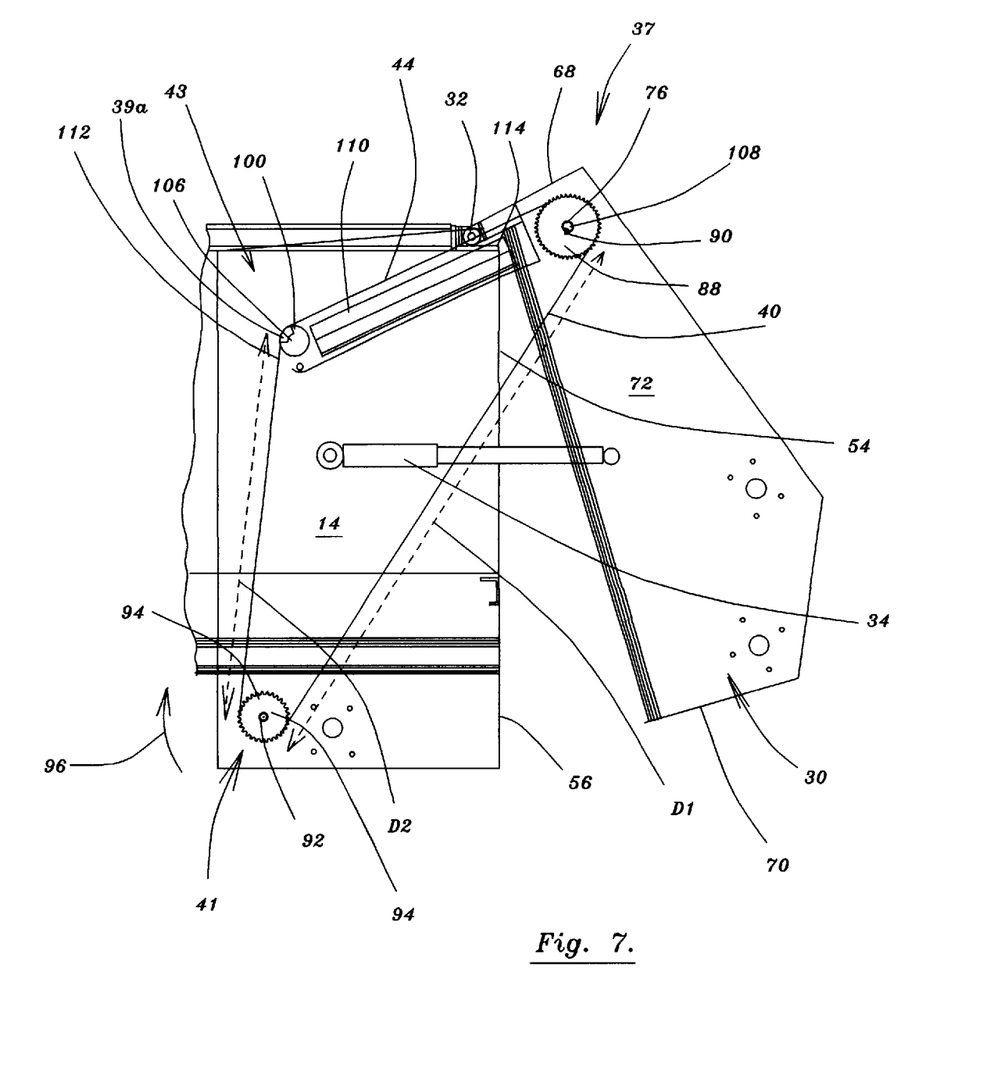
FIG. 7 is a similar view to that shown in FIG. 6 but shows an alternative embodiment of the present invention in which the idler sprocket is replaced by a sliding block bearing.

FIG. 7 is a similar view to that shown in FIG. 6 but shows an alternative embodiment of the present invention in which the idler sprocket 39 is replaced by a sliding block bearing 39a.

In operation of the distributor apparatus, manure is loaded into the container 14 through the opening 24. The driving shaft is rotated as indicated by the arrow 96 so that power is transmitted via the chain 40 to the driven shaft 76 and the distributor arms. In the event of a rock becoming lodged within the distributing device 30, the device 30 is pivoted outwardly to the second location as shown in FIG. 6 such pivoting being accomplished while the distributor arms are still being rotated. In many cases, an obstruction can be cleared simply by pivoting the distributing device 30. However, if the blockage cannot be cleared by pivoting the distributing device, the drive to the distributor arms is stopped with the distributing device 30 in the second location. The container can then be rapidly unloaded by lifting the tongue 50 to tilt the container 14 so that the manure is emptied through the outlet 28.

Although in the present invention, the distributing device is shown as including a horizontal distributor, it will be appreciated by those skilled in the art that distributor arms rotating about vertical axes could be provided. Also, although only one distributor is shown in the drawings, several distributors disposed parallel relative to each other could be provided. Furthermore, variations of the present invention would include having a pivoted plate for rotatably supporting a pair of idler sprockets so that when the distributing device is opened, the plate pivots for accommodating the change in the path taken by the chain. Also, those skilled in the art will appreciate that instead of an idler sprocket 39, the present invention envisages use of a sliding block bearing such as a nylon block for bearing against and sliding relative to the chain 40.

Furthermore, the driven means 37 includes a distributor with distributor arms which can extend radially from the driven shaft or may be pivotally secured to the driven shaft or extensions therefrom.

The driving means 40 includes preferably a drive chain. However, a belt or cable drive could be used with corresponding cooperating pulleys.

Also, although the present invention shows the distributing device pivotally secured to the second end of the container, the distributing device could be secured to one of the sides of the container. The aforementioned alternative arrangement could be achieved by hinging the distributing device about a horizontal or a vertical pivot.

The present invention provides a unique way of providing a mechanical chain drive for a distributor apparatus which maintains a constant torque to the distributor regardless of the location of the distributing device, thus considerably reducing the overall cost of the apparatus.

What is claimed is:

1. A distributor apparatus for spreading materials, said apparatus comprising:
    a container having a first and a second end and a first and a second side, said container defining an opening for the reception therein of the materials;
    said container defining an outlet for the movement therethrough of the materials;
    a distributing device disposed in a vicinity of said outlet, said distributing device being pivotally secured to said container about a pivotal axis;
    said distributing device further including:
        a frame;
        a driven means rotatably secured to said frame for ejecting the materials from said container;
        driving means for rotating said driven means such that the materials are moved from said container through said outlet for distribution by said driven means;
        a drive for driving said driving means;
        a guide for guiding said driving means between said driven means and said drive, the arrangement being such that an approximate sum of a distance travelled by said driving means around said drive to said driven means plus a further distance travelled by said driving means from said guide to said drive remains constant when said distributing device is pivoted from a first location adjacent to said container to a second location of said distributing device away from said container so that slack of said driving means is minimized during pivoting of said distributing device between said locations;
        said guide and said driven means being rotatable about an axis and a further axis of rotation respectively, said axis of said guide being spaced from and at a constant distance relative to said further axis of said driven means; and
        said axis of said guide and said further axis of said driven means moving about a common pivotal axis which is disposed between and spaced relative to said axis of said guide and said further axis of said driven means.

2. A distributor apparatus as set forth in claim 1 further including:
    a mechanism for swinging said distributing device away from said outlet about said pivotal axis for permitting access to said outlet.

3. A distributor apparatus as set forth in claim 2 wherein said mechanism includes:
    a lifting cylinder having a first and a second extremity, said first extremity being pivotally secured to said container, said second extremity being pivotally secured to said distributing device such that when said lifting cylinder is actuated, said distributing device is pivoted about said pivotal axis between said first and second locations thereof.

4. A distributor apparatus as set forth in claim 3 wherein said lifting cylinder is hydraulically operated.

5. A distributor apparatus as set forth in claim 1 further including:
    a chassis for supporting said container;
    a plurality of wheels rotatably secured to said chassis for permitting transportation of said chassis and said container supported thereon.

6. A distributor apparatus as set forth in claim 5 further including:
    a tongue extending from said chassis, said tongue being disposed adjacent to said first end of said container, said tongue being used to draw and transport said container.

7. A distributor apparatus as set forth in claim 1 wherein said container is of rectangular box shaped configuration, said opening permitting loading of the materials into said container.

8. A distributor apparatus as set forth in claim 1 further including:
    a cover which cooperates with said opening for inhibiting spillage of the materials from said container during transportation thereof.

9. A distributor apparatus as set forth in claim 1 wherein said pivotal axis is disposed horizontally.

10. A distributor apparatus as set forth in claim 9 wherein said distributing device is disposed beneath said pivotal axis.

11. A distributor apparatus as set forth in claim 1 wherein said second end of said container includes:
    an upper and a lower edge;
    said first side of said container includes:
        a first edge;
    said second side of said container includes:
        a second edge, said upper and lower edges and said first and second edges cooperating together to define said outlet.

12. A distributor apparatus as set forth in claim 11 wherein said pivotal axis is disposed parallel and spaced relative to said upper edge of said second end of said container.

13. A distributor apparatus as set forth in claim 1 wherein said frame cooperates with and lies adjacent to said outlet when said distributing device is disposed in said first location thereof.

14. A distributor apparatus as set forth in claim 1 wherein said driven means includes:
    a driven shaft having a first and a second end, said driven shaft being bearingly supported by and extending through said frame;
    a plurality of distributor arms secured to said driven shaft, said distributor arms extending radially from said driven shaft for distributing the materials when said driven shaft is being rotated.

15. A distributor apparatus as set forth in claim 14 wherein said driven means further includes:
    a driven sprocket which cooperates with said driving means such that movement of said driving means relative to said driven sprocket rotates said driven sprocket;
    a locking means disposed between said driven sprocket and said driven shaft such that rotation of said driven sprocket rotates said driven shaft and said distributor arms secured thereto.

16. A distributor apparatus as set forth in claim 1 wherein said driving means is a chain.

17. A distributor apparatus as set forth in claim 1 wherein said driving means is a belt.

18. A distributor apparatus as set forth in claim 1 wherein said drive includes:
    a driving shaft bearingly supported by said container;
    a driving sprocket locked to said driving shaft and cooperating with said driving means so that when said driving shaft is rotated, such rotation is transmitted to said driven means by said driving means.

19. A distributor apparatus as set forth in claim 1 wherein said guide is secured to said frame.

20. A distributor apparatus as set forth in claim 1 wherein said guide includes:
   an idler sprocket which cooperates with and is driven by said driving means.

21. A distributor appratus for spreading materials, said apparatus comprising:
   a container having a first and a second end and a first and a second side, said container defining an opening for the reception therein of the materials;
   said container defining an outlet for the movement therethrough of the materials;
   a distributing device disposed in a vicinity of said outlet, said distributing device being pivotally secured to said container about a pivotal axis;
   said distributing device further including:
      a frame;
      a driven means rotatably secured to said frame for ejecting the materials from said container;
      driving means for rotating said driven means such that the materials are moved from said container through said outlet for distribution by said driven means;
      a drive for driving said driving means;
      a guide for guiding said driving means between said driven means and said drive, the arrangement being such that an approximate sum of a distance travelled by said driving means around said drive to said driven means plus a further distance travelled by said driving means from said guide to said drive remains constant when said distributing device is pivoted from a first location adjacent to said container to a second location of said distributing device away from said container so that slack of said driving means is minimized during pivoting of said distributing device between said locations;
   said frame including:
      an upper member;
      a lower member disposed spaced and parallel relative to said upper member;
      a first panel; and
      a second panel disposed spaced and parallel relative to said first panel, said first and second panels extending between said upper and lower members.

22. A distrubutor apparatus for spreading materials, said apparatus comprising:
   a container having a first and a second end and a first and a second side, said container defining an opening for the reception therein of the materials;
   said container defining an outlet for the movement therethrough of the materials;
   a distributing device disposed in a vicinity of said outlet, said distributing device being pivotally secured to said container about a pivotal axis;
   said distributing device further including:
      a frame;
      a driven means rotatably secured to said frame for ejecting the materials from said container;
      driving means for rotating said driven means such that the materials are moved from said container through said outlet for distribution by said driven means;
      a drive for driving said driving means;
      a guide for guiding said driving means between said driven means and said drive, the arrangement being such that an approximate sum of a distance travelled by said driving means around said drive to said driven means plus a further distance travelled by said driving means from said guide to said drive remains constant when said distributing device is pivoted from a first location adjacent to said container to a second location of said distributing device away from said container so that slack of said driving means is minimized during pivoting of said distributing device between said locations;
   said guide including:
      an idler sprocket which cooperates with and is driven by said driving means; and
   said guide further including:
      an extension plate having a first and a second end, said first end supporting said idler sprocket, said second end of said plate being rigidly secured to said frame.

23. A distributor apparatus for spreading materials, said apparatus comprising:
   a container having a first and a second end and a first and a second side, said container defining an opening for the reception therein of the materials;
   said container defining an outlet for the movement therethrough of the materials;
   a distributing device disposed in a vicinity of said outlet, said distributing device being pivotally secured to said container about a pivotal axis;
   said distributing device further including:
      a frame;
      a driven means rotatably secured to said frame for ejecting the materials from said container;
      driving means for rotating said driven means such that the materials are moved from said container through said outlet for distribution by said driven means;
      a drive for driving said driving means;
      a guide for guiding said driving means between said driven means and said drive, the arrangement being such that an approximate sum of a distance travelled by said driving means around said drive to said driven means plus a further distance travelled by said driving means from said guide to said drive remains constant when said distributing device is pivoted from a first location adjacent to said container to a second location of said distributing device away from said container so that slack of said driving means is minimized during pivoting of said distributing device between said locations; and
   said guide including:
      a sliding block bearing which cooperates with and slides relative to said driving means.

* * * * *

UNITED STATES PATENT AND TRADEMARK OFFICE
CERTIFICATE OF CORRECTION

PATENT NO.    : 6,241,451 B1
DATED         : June 5, 2001
INVENTOR(S)   : Christopher Albright et al.

It is certified that error appears in the above-identified patent and that said Letters Patent is hereby corrected as shown below:

Column 5,
Line 49, "driving" should be deleted and "drivingly" substituted therefore.

Signed and Sealed this

Twenty-ninth Day of January, 2002

Attest:

Attesting Officer

JAMES E. ROGAN
Director of the United States Patent and Trademark Office